Jan. 3, 1928.
F. E. BEERY
1,654,914
JAR AND OTHER RECEPTACLE AND CLOSURE THEREFOR
Filed Sept. 27, 1926
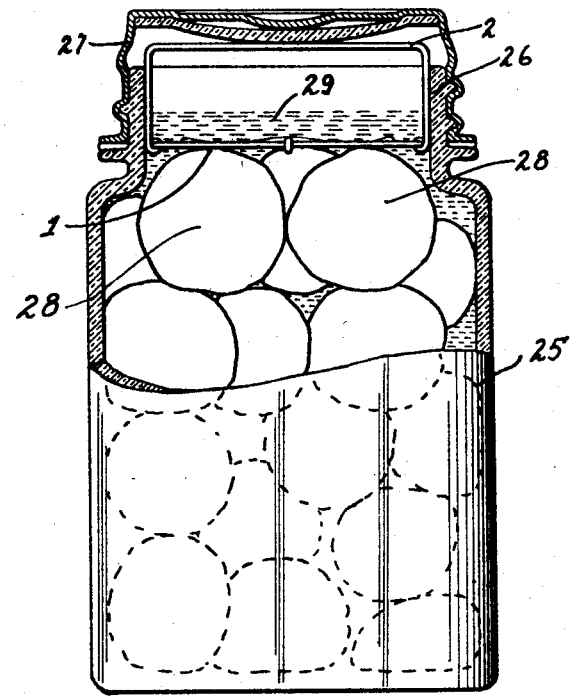
Fig. 1.
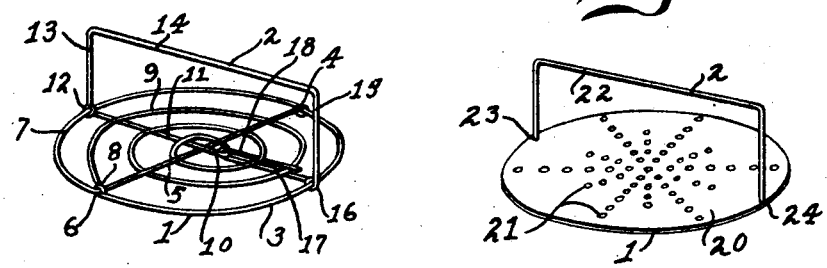
Fig. 2.
Fig. 3.
INVENTOR,
Florence E. Beery;
BY
ATTORNEYS.

Patented Jan. 3, 1928.

1,654,914

UNITED STATES PATENT OFFICE.

FLORENCE E. BEERY, OF LOS ANGELES, CALIFORNIA.

JAR AND OTHER RECEPTACLE AND CLOSURE THEREFOR.

Application filed September 27, 1926. Serial No. 137,988.

This invention relates to improvements in jars and other receptacles and closures therefor, and more particularly to means for maintaining fruit or other solid food products submerged below the level of the liquid content in horizontally sealed jars, to prevent moulding of the contents at the surface thereof.

The general object of the invention is to provide a device which may be placed in the mouth of a fruit jar and engaged by the jar cap to hold the fruit or other solid content submerged below the liquid content of the jar, whereby molding of the contents of the jar at the surface thereof is prevented.

A more particular object is to provide a device of the character stated which will be simple in construction, inexpensive, and efficient in use.

With the above and other objects in view, the invention consists in the novel and useful provision, formation, construction, association and relative arrangement of parts, members, and features, all as disclosed in the drawing, and more particuarly pointed out in claim.

In the drawing:

Figure 1 is a view of a fruit jar, the lower portion of which is shown in elevation and the upper portion in vertical section, with my invention shown in the mouth of the jar engaged by the jar top and holding the fruit submerged below the level of the liquid content of the jar;

Figure 2 is a perspective view of one form of my invention; and,

Figure 3 is a perspective view of another form of my invention.

Corresponding parts in all the figures are designated by the same reference characters.

This invention comprises a flat circular member 1 and a bridge member 2 upstanding from and extending diametrically over said presser member. The device may be made in different forms, two of which forms are shown in Figs. 2 and 3.

In the form of the invention shown in Fig. 2 the device is made of a single piece of wire 3, which is first bent in a loop 4 and extended diametrically across the member 1, as indicated at 5, to a point 6, then from said point the wire is bent in a circular ring 7 through loop 4 back to said point 6 where the wire is twisted in a loop 8 around the straight diametrical portion 5, then bent inwardly in a spiral 9 to the center of the member 1 where the wire is bent in a loop 10, then radialy outward at 11 at right angles to the diametrical portion 5, and the wire is then twisted around the ring 7 at 12, then bent upwardly at 13, then diametrically over the member 1 at 14, then downwardly at 15, then twisted around the ring 7 at 16, then extended inwardly radially at 17 to the loop 10 around which the wire is bent in the form of a hook 18.

In the form of the invention shown in Fig. 3 the presser member 1 comprises a perforated disk 20 provided with perforations 21, while the bridge member 2 comprises a single piece of wire 22 bent V-shaped and inverted and secured at its ends to the edge of the disk 20 at diametrically opposite points 23 and 24.

In Fig. 1 I have illustrated a fruit jar 25, the mouth 26 of which is closed by a screw cap 27.

My device is placed within the mouth 26 of the jar with its presser member 1 upon the fruit 28 in the top of the jar, and the cap 27 being screwed on the top of the jar engages the bridge 2 of the device and forces the device downwardly, while the presser member 1 presses the fruit 28 downwardly and submerges the same below the level of the liquid content 29 in the jar. The wire construction of the presser member 1 of the device as shown in Fig. 2 and the perforated disk construction of the presser member 1 of the device as shown in Fig. 3 provides open construction presser members through which the liquid 29 may readily pass.

The solid content being held submerged by the device below the level of the liquid content, moulding of the contents at the upper surface thereof is prevented.

It is obvious that various changes and modifications may be made in practicing the invention, in departure from the specific showing of the drawing, without departing from the true spirit of the invention.

Having thus disclosed my invention, I claim and desire to secure by Letters Patent:

A device of the character disclosed, a wire presser member, including a circular wire portion, two diametric wire portions, joined to the circular wire portion, and a spiral wire portion joined with the circular wire portion, and said diametric wire portions and a bridge upstanding from the circular portion and diametrically spanning the same.

In testimony whereof, I have signed my name to this specification.

FLORENCE E. BEERY.